Aug. 11, 1953  C. F. BAROTHY  2,648,465
TILTABLE HOLDER FOR SUPPLY PANS
Filed Feb. 21, 1951  2 Sheets-Sheet 1

INVENTOR:
C. F. BAROTHY
BY
ATT'YS

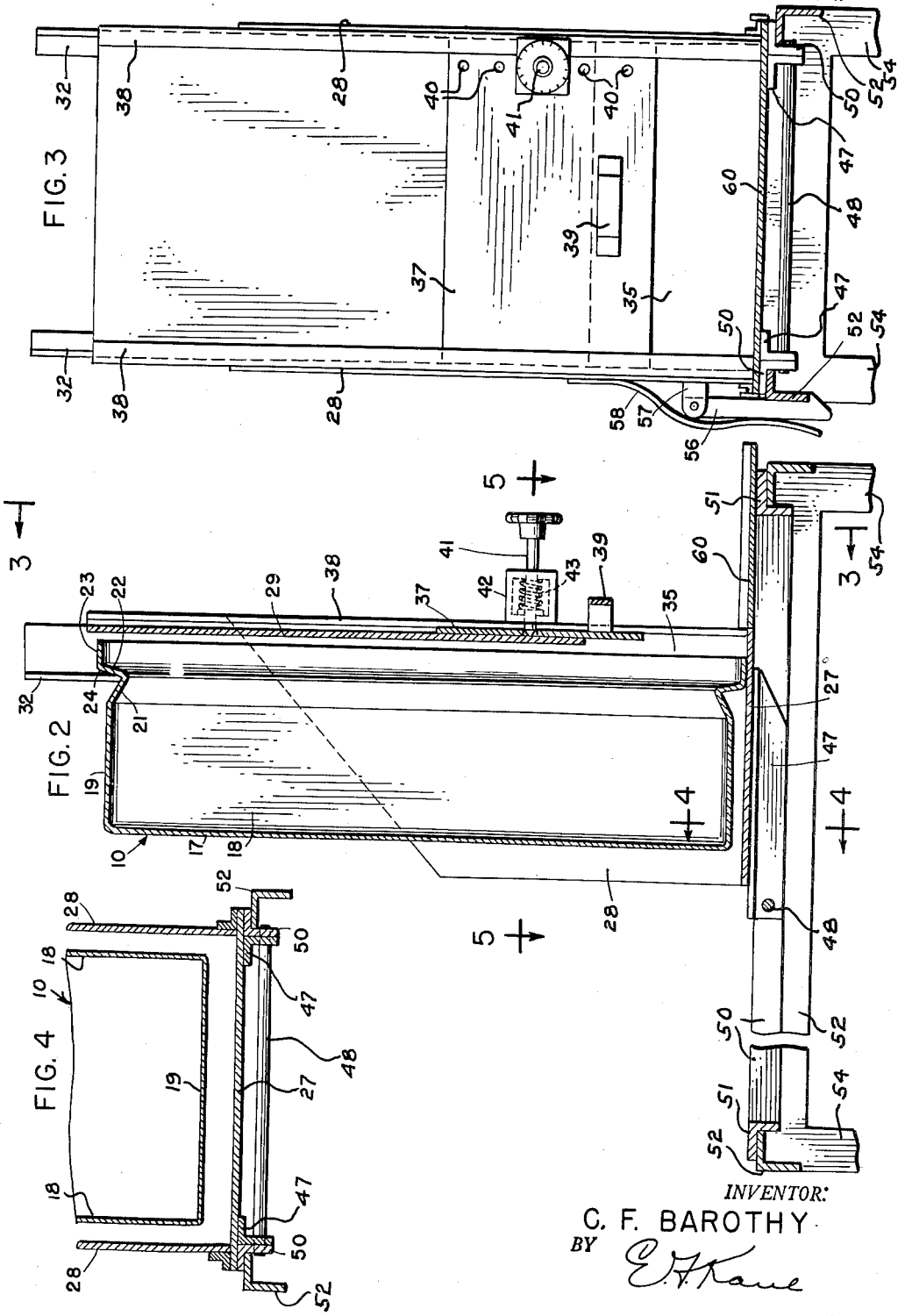

Patented Aug. 11, 1953

2,648,465

UNITED STATES PATENT OFFICE 2,648,465

TILTABLE HOLDER FOR SUPPLY PANS

Charles F. Barothy, Indianapolis, Ind., assignor to Western Electric Company, Incorporated, New York, N. Y., a corporation of New York Application February 21, 1951, Serial No. 212,119

9 Claims. (Cl. 222—165)

This invention relates to a device for dispensing small parts and more particularly to a device for tilting open containers of small parts to discharge the parts from the containers and control the discharge of them.

In the manufacture of small piece parts the parts are frequently received in open top containers or tote pans in which the parts may be carried from one place or machine to another or which may be stacked on one another to store the parts until they are needed. Because the pans are of relatively large size and depth it is inconvenient for an operator to select one part from the pan for further processing.

It is an object of the present invention to provide a device for tilting open containers of small parts to discharge the contents thereof and to regulate the discharge of the contents therefrom.

In accordance with one embodiment of the invention for use with open rectangular pans containing small parts, there is provided a holder having a pair of spaced channel-shaped guide members for slidably receiving the pans therein, a base for tiltably supporting the holder thereon for movement from a substantially horizontal position in which the pan may be applied to or removed from the holder and a tilted position for discharging the contents of the pan, and having a top wall and a slidable door cooperating to cover the open top of the pan during the tilting movement thereof, and means for holding the door in an open position to provide a restricted opening through which the piece parts may flow into a supporting surface.

Other objects and advantages of the invention will become apparent by reference to the following detailed description thereof and the accompanying drawings illustrating a preferred embodiment of the invention, in which Fig. 1 is a perspective view of a device for supporting and tilting a container for small parts showing a holder for the container in horizontal position and the container being applied thereto;

Fig. 2 is a vertical longitudinal sectional view of the device showing the holder and the container therein in a vertical position;

Fig. 3 is a vertical sectional elevational view taken on the line 3—3 of Fig. 2;

Fig. 4 is a fragmentary vertical sectional view taken on the line 4—4 of Fig. 2.

Figure 1:
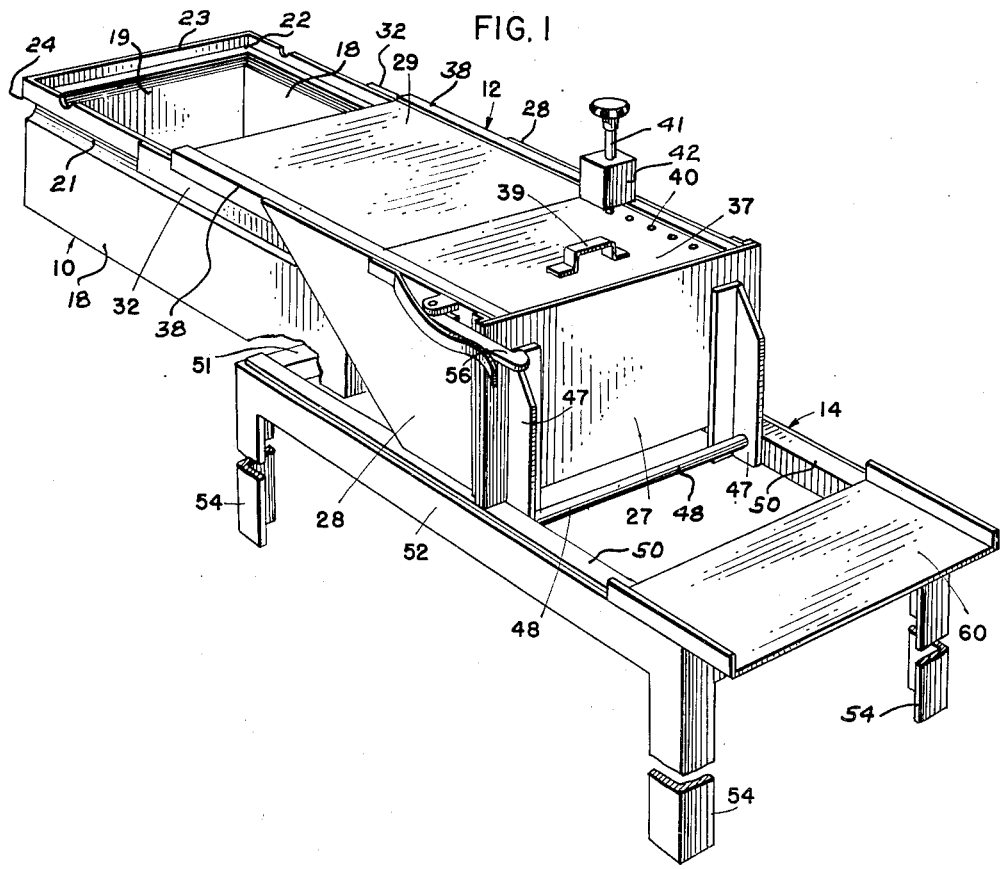
Figure 5:
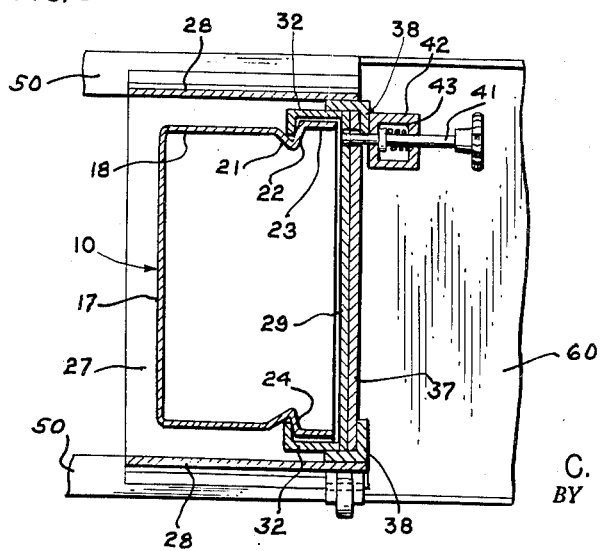
Fig. 5 is a horizontal sectional view of a portion of a device taken on the line 5—5 of Fig. 2.

Referring to Fig. 1 of the drawings a container or open pan 10 for holding a supply of relatively small parts is indicated as being applied to a holder 12 which is pivotally mounted on a base 14 for rocking movement to and from a horizontal position indicated in Fig. 1 and a vertical or upright position indicated in Fig. 2. The pan 10 is of rectangular contour having a bottom wall 17, side walls 18—18, end walls 19—19, and an open top opposite the bottom wall 17. Adjacent the top portion thereof the side and end walls are provided with an inwardly extending groove or rib 21 forming a ledge 22 substantially parallel with the bottom wall and a flange 23 extending parallel to and outwardly from the side and end walls. The ledges 22 and flanges 23 form a shoulder 24 projecting laterally from and around the top end of the pan 10 and provides a seat for the reception of the bottom of another pan 10 of similar construction to permit the stacking of a plurality of pans.

The holder 12 for the pan 10 comprises an end wall 27, a pair of side walls 28—28 and a top wall 29 suitably secured together at right angles to each other as indicated in the drawings. The side walls 28 are provided on the inner sides thereof with a pair of rails 32 extending longitudinally thereof and in spaced relation to the top wall 29 to form in cooperation with the top wall, channel guide members for receiving the shoulder portion 24 of the pans 10 for sliding movement therein. The rails 32 in the form of angle bars extend beyond the side walls to facilitate the insertion of the pan in the holder. With the holder 12 in the position shown in Fig. 1 the side shoulder portion 24 of the pan 10 is placed on the projecting portions of the rails 32 in alignment with the channel guide members formed in the holder and the pan 10 is slid therealong into engagement with the end wall 27 and is supported in the holder 12. The top wall 29 has one end thereof spaced from the end wall 27 to form an opening or doorway 35 between the end and top walls. Thus the top wall 29 serves to close or cover the major portion of the pan opening.

The opening 35 is adapted to be closed by a door 37 slidably mounted on the top wall 29 and guided for movement in a pair of guide members 38 on the holder 12. The top wall 29 and the door 37, when in closed position, form a closure which completely covers the open end of the pan 10 and prevents the contents of the pan 10 from falling out during the movement of the pan 10 from its horizontal position shown in Fig. 1 to its upright position shown in Fig. 2. The sliding door 37 is provided with a handle 39 by means of which the door may be moved from its closed position to provide an opening or doorway of different sizes for controlling the passage of the small parts therethrough. A locking bolt 41 slidably mounted in a block 42 secured to one edge of the guide 38 and stressed to its closed position by a spring 43 has its end portion engageable in the holes 40 to secure the door in its closed or any of its several open positions.

Secured to the end wall 27 are a pair of pivot lugs 47—47, in the form of angle bars, through apertures in which there extends a pivot rod 48 which also extends into apertures in angle frame members 50. The angle members 50 are connected together at their ends by angle members 51 which together with the angle members 50 form a rectangular framework supported on and secured to a rectangular framework 52 formed of angle bars. The framework formed by the angle bars 50, 51 and 52 constitutes the base 14 which as indicated in Fig. 1 is provided with legs 54 to support the base 14 and the holder 12 at a desired elevation in spaced relation to the floor. The pivot rod 48 is located in spaced relation to one edge of the holder 12 and permits the holder to be moved to and from the positions shown in Figs. 1 and 2. Portions of the holder are so disposed above the frame members 50 that when the holder is in the position as shown in Fig. 1 the edge portions of the side walls 28 engage the angle frame members 50 to support the holder in the horizontal position and when the holder is in the vertical or upright position shown in Fig. 2 the bottom wall 27 engages and is supported by the angle bars 50.

In order to prevent the accidental movement of the holder from its upright position a latch member 56 is pivotally mounted to a lug 57 on one side of the holder to engage the angle frame member 52 and lock the holder against movement. A leaf spring 58 serves to yieldably maintain the latch 56 in engagement with the angle member 52. A plate 60 is mounted on the angle framework 50 to form a work supporting surface on the base 14 for receiving the parts as they are discharged from the pan 10 and is positioned with one edge thereof adjacent the end wall 27 of the holder and parallel thereto when the holder is in its upright position. The plate 60 may be of any desired shape to support and guide the parts for sliding movement thereon into any desired position for further processing, as for example, into close proximity to the dies of a punch press.

When it is desired to dispense the parts contained in a pan 10 onto the work supporting surface 60 the pan 10 with the parts therein is applied to the guides 32 when the holder is in its horizontal position as indicated in Fig. 1 and the pan is advanced into engagement with the bottom wall 27 thereof after which the holder 12 is moved to its upright position as shown in Fig. 2 to tilt the pan to discharge the contents thereof. After the holder has been moved to its upright position the locking bolt 41 may be withdrawn and the sliding door 37 raised to provide a discharge opening of the desired size through which the parts are discharged onto the work supporting table 60 after which the bolt 41 is released to engage in one of the apertures 40 to lock the sliding door 37 in its set position. The parts within the container 10 will flow out through the opening 35 and accumulate in a pile adjacent the opening in a position where they may be selected individually by the operator and removed therefrom in a convenient manner as by sliding along the work supporting surface 60.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for tilting open top containers of small parts and controlling the discharge of the contents thereof comprising a base, a holder having guide means for slidably receiving said container therein for movement in one direction and retaining said container against movement transversely to said one direction, means on said holder for limiting the movement of said container in the holder in said one direction, means pivotally mounting said holder on said base for movement to and from a first position with said guide means in a substantially horizontal position to permit the insertion and removal of said container with the open top uppermost and a second position with the guide means substantially vertical for tilting said container to permit the discharge of the contents thereof, said base cooperating with said holder in said first and said second positions to support said holder in said first and said second positions, and closure means on said holder engageable with the open top of said container to provide a closure therefor, said closure means being adjustable to provide a discharge opening at one side of the holder and at the lower end of the open top of the container when the container is in said second position for the contents of said container to pass through.

2. A device for tilting open top containers of small parts and controlling the discharge of the contents thereof comprising a base having a work supporting surface for receiving the parts discharged from said container, a holder having guide means for slidably receiving said container therein for movement in one direction and retaining said container against movement transversely to said one direction, means on said holder for limiting the movement of said container in said one direction, means mounting said holder for rocking movement on said base, means for supporting said holder in one position with the guide means in a substantially horizontal position to permit the loading and unloading of a container, means for supporting said holder in another position with the guide means upright to tilt the container to discharge the contents thereof onto the work supporting surface of said base, and closure means on said holder engageable with the open top of said container for covering the top of said container, said closure means being adjustable to provide an adjustable opening on one side of the holder when the holder is in said other position for the removal of the parts from said container.

3. A device for tilting open top containers of small parts and controlling the discharge of the contents thereof comprising a stand having a work supporting member for receiving the parts discharged from a container, a holder for supporting said container comprising a pair of channel shaped guide members for slidably receiving side portions of the container for supporting said container, means mounting said guide members in spaced relation to each other and for rocking movement on said stand to and from a horizontal position in which said container may be applied to and removed from the holder and a vertical position to tilt the container to discharge the contents thereof onto said work supporting member, a wall on said holder forming a relatively stationary cover for a portion of the open top of the container, and a door movably mounted on said wall and cooperating therewith in one position to cover all of the open top of the container and operable in other positions to form an adjustable opening at the side of said holder when said holder is in a vertical position for the passage of the contents of the container therethrough.

4. A device for tilting open top containers of small parts and controlling the discharge of the contents thereof comprising a base having a work supporting surface for receiving the parts, a member mounted on said base for rocking movement, means for holding said container on said rockable member, means for supporting said member in a first position for receiving said container in an upright position and in a second position for tilting said container to discharge the contents onto said work supporting surface, and closure means on said member engageable with the open top of said container for covering same, said closure means including a movable door to provide an adjustable opening at the side of the holder when said holder is in said second position for the discharge of the contents of said container therethrough.

5. A device for tilting open top containers of small parts and controlling the discharge of the contents thereof comprising a base, a closure means including a pair of members for covering the open top of said container, means guiding one of said members for movement relative to the other to uncover an end portion of the open top of said container and form a restricted passageway communicating with said container, means for securing said members in adjusted relation with respect to each other, means for removably securing said container to said closure means, means pivotally mounting said closure means on said base for rocking movement to and from a substantially horizontal position for receiving the container in upright position and a substantially vertical position to tilt the container for discharging the contents thereof through said restricted passageway, means for supporting said closure means in said substantially horizontal position and said substantially vertical position, and means forming a supporting surface at the lower end of said container in said vertical position for supporting the parts discharged from said container.

6. A device for tilting open top containers of small parts and controlling the discharge of the contents thereof comprising a stand, closure means engageable with the open top of said container for covering same including a slidable member forming a door for providing an adjustable discharge opening therein at one end of the container, means for removably securing said container to said closure means, means pivotally mounting said closure means on said stand for oscillatable movement, means supporting said closure means in a first position for receiving said container in an upright position, and means supporting said closure means in a second position to tilt the container to discharge the contacts thereof through said discharge opening.

7. A device for tilting open top tote pans containing small parts and controlling the discharge of the contents thereof comprising a base, a rectangular holder for supporting said pan comprising a top wall, a pair of side walls and an end wall arranged in transverse relation to each other, members on said side walls forming guides for slidably receiving the side portions of said pan therein, said end wall being engageable with the end of said pan and serving to limit the movement of said pan in said guides in one direction and said top wall being spaced from the end wall and serving to cover a portion of said open top of said pan, a door on said top wall to cover the remainder of said open pan, means on said holder for guiding said door for sliding movement on said top wall to uncover a portion of said pan and form a passageway for the contents of the pan, means for securing said door in adjusted position on said holder, and means pivotally mounting said holder on said base for oscillation to and from a first substantially horizontal position for receiving said pan therein in an upright position and a second substantially vertical position tilting the pan to discharge the contents thereof through said passageway, said base cooperating with the holder to support said holder and the pan therein in said horizontal and said vertical positions.

8. A device for tilting open top containers of small parts comprising a base, a holder comprising an end wall, parallel side walls extending therefrom in spaced relation to each other, and guide members on said side walls for supporting a container for sliding movement into and out of said holder and into engagement with the end wall thereof, means for tiltably supporting said holder on said base for movement to and from a first position with the guide members substantially horizontal to permit the loading into and the unloading from the holder of a container with the open top uppermost and a second position with the guide members substantially vertical to support the container with the open top directed sideways, means on said holder cooperating with said side and end walls to form an adjustable closure for the open top of the container in said holder, means for holding said adjustable closure in adjusted position to provide an opening adjacent said end wall through which the interior of the container is accessible and through which the contents of said container may pass, said base cooperating with said holder to support the holder in said first and said second positions, and a member on said base in alignment and cooperable with the end wall of said holder when said holder is in said second position to form a supporting surface for the parts discharged from said container.

9. A device for tilting open top containers of small parts comprising a base, a holder comprising an end wall, parallel side walls extending therefrom in spaced relation to each other, and guide tracks on said side walls for slidably supporting a container for movement into and out of said holder and into engagement with the end wall thereof, means for tiltably supporting said holder on said base for movement to and from a first position with the tracks substantially horizontal to permit the loading and the unloading of a container to and from the holder with the open top of the container uppermost and a second position with the guide members substantially vertical to support the container with the open top directed laterally, means on said holder cooperating with said side and end walls to form an adjustable closure for the open top of the container in said holder, means for holding said adjustable closure in adjusted position to provide an opening adjacent said end wall through which the interior of the container is accessible and through which the contents of said container may pass, said base cooperating with the side walls of said holder to support the holder in said first position and cooperable with the end wall to support the holder in said second position, a member on said base cooperable with the end wall of said holder when said holder is in said second position to form a horizontal surface for receiving the parts discharged from said container, and means for latching said holder in said second position.

CHARLES F. BAROTHY.

References Cited in the file of this patent

UNITED STATES PATENTS

| Number | Name | Date |
|---|---|---|
| 408,125 | Miller | July 30, 1889 |
| 508,327 | Lippincott | Nov. 7, 1893 |
| 577,881 | Puffer | Mar. 2, 1897 |
| 579,252 | Besson | Mar. 23, 1897 |
| 582,697 | Schneider | May 18, 1897 |
| 984,951 | Macon | Feb. 21, 1911 |
| 1,097,355 | Owen | May 19, 1914 |
| 1,540,165 | Cytron | June 2, 1925 |
| 1,557,273 | Secrist | Oct. 13, 1925 |
| 1,712,662 | Gates | May 14, 1929 |
| 1,986,864 | Tolley | Jan. 8, 1935 |
| 2,345,074 | Sargent et al. | Mar. 28, 1944 |